(12) United States Patent
Yabe et al.

(10) Patent No.: US 8,042,130 B2
(45) Date of Patent: Oct. 18, 2011

(54) OPTICAL DRIVING DEVICE INCLUDING A HOLDER WITH A TOP FACE HAVING A CLOSED STRUCTURE

(75) Inventors: Mitoru Yabe, Tokyo (JP); Keiji Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 649 days.

(21) Appl. No.: 12/224,395
(22) PCT Filed: Jan. 22, 2007
(86) PCT No.: PCT/JP2007/050885
§ 371 (c)(1),
(2), (4) Date: Aug. 26, 2008
(87) PCT Pub. No.: WO2007/111034
PCT Pub. Date: Oct. 4, 2007

(65) Prior Publication Data
US 2010/0153980 A1 Jun. 17, 2010

(30) Foreign Application Priority Data
Jan. 22, 2006 (JP) ................................ 2006-092016

(51) Int. Cl.
*G11B 7/08* (2006.01)
(52) U.S. Cl. ....................................................... 720/681
(58) Field of Classification Search ............. 369/44.14, 369/44.15; 720/681, 683; 859/813, 824
See application file for complete search history.

(56) References Cited

U.S. PATENT DOCUMENTS

| | | | | |
|---|---|---|---|---|
| 4,767,187 A * | 8/1988 | Gijzen et al. | .................. | 359/813 |
| 5,323,378 A * | 6/1994 | Kim et al. | ..................... | 720/684 |
| 5,488,603 A * | 1/1996 | Tomita et al. | .................. | 720/683 |
| 5,526,340 A * | 6/1996 | Tanaka | ........................... | 720/685 |
| 5,663,840 A * | 9/1997 | Matsui | ........................... | 359/814 |
| 5,673,247 A * | 9/1997 | Sekimoto et al. | ........ | 369/112.17 |
| 5,699,340 A * | 12/1997 | Lee et al. | ..................... | 369/53.19 |
| 5,768,037 A * | 6/1998 | Marino et al. | ................. | 359/824 |
| 7,200,849 B2 * | 4/2007 | Aikoh et al. | .................... | 720/681 |
| 7,327,644 B2 * | 2/2008 | Ohkuma | .................... | 369/44.32 |
| 7,631,322 B2 * | 12/2009 | Kang et al. | ..................... | 720/683 |
| 2003/0103441 A1 | 6/2003 | Kim et al. | | |
| 2003/0218963 A1 * | 11/2003 | Takeshita et al. | .............. | 369/244 |
| 2004/0172643 A1 * | 9/2004 | Shinozuka | ..................... | 720/681 |
| 2005/0007906 A1 | 1/2005 | Horinouchi et al. | | |
| 2005/0050569 A1 * | 3/2005 | Yamanaka et al. | ............. | 720/683 |
| 2007/0067788 A1 * | 3/2007 | Yamamoto et al. | ........... | 720/681 |
| 2008/0052734 A1 * | 2/2008 | Arai et al. | ...................... | 720/681 |

FOREIGN PATENT DOCUMENTS

| | | |
|---|---|---|
| JP | 5-81682 A | 4/1993 |
| JP | 9-297927 A | 11/1997 |
| JP | 10-312572 A | 11/1998 |
| JP | 2002-208150 A | 7/2002 |
| JP | 2002-245650 A | 8/2002 |
| JP | 2003-281758 A | 10/2003 |
| JP | 2005-174485 A | 6/2005 |
| JP | 2005-302162 A | 10/2005 |
| JP | 2005-302163 A | 10/2005 |
| JP | 2006-79781 A | 3/2006 |

* cited by examiner

*Primary Examiner* — Brian Miller
(74) *Attorney, Agent, or Firm* — Birch, Stewart, Kolasch & Birch, LLP.

(57) ABSTRACT

The optical driving device according to the present invention includes a holder for holding a plurality of optical each of which focuses on an optical disk a light beam outputted from a light source, focusing coils, and tracking coils; a plurality of elastic support members for supporting the holder so as to be movable in an approximately radial direction of the optical disk and in an approximately perpendicular direction to the optical disk; and a base for holding inner yokes placed inside the holder, and magnets that generate magnetic fields with respect to the focusing coils and to the tracking coils; as for the optical driving device, the top face of the holder has a closed structure over the inner yokes.

10 Claims, 9 Drawing Sheets

Light Beam α

Light Beam β

OPTICAL DRIVING DEVICE INCLUDING A HOLDER WITH A TOP FACE HAVING A CLOSED STRUCTURE

TECHNICAL FIELD

The present invention relates to optical disk apparatus such as a DVD (digital versatile disc) recorder and a BD player used for performing information recording to or playback from an information recording medium, in particular, to optical driving devices.

BACKGROUND OF THE INVENTION

In recent years, there developed are various kinds of optical disks each of which is different in the recording density, a cover-layer thickness or the like; for example there are a CD (compact disc) whose usable wavelength is in the vicinity of 780 nm, a DVD (digital versatile disc) whose usable wavelength is in the vicinity of 660 nm, a BD (Blu-ray disc) and an HD-DVD (high definition DVD) whose usable wavelength is in the vicinity of 405 nm, and the like. In such an optical disk apparatus adapted to a plurality of kinds of optical disks whose usable wavelengths are different to one another, there is an apparatus which includes a plurality of objective lenses so as to obtain a focusing spot corresponding to each of the optical disks. (For example, refer to Patent Document 1.)
[Patent Document 1] Japanese Laid-Open Patent Publication No. 2003-281758 (Pages 1 through 11, FIG. 2 through FIG. 13)

SUMMARY OF THE INVENTION

In the optical disk apparatus in Patent Document 1, the weight of a movable unit increases to mount a plurality of objective lenses on a lens holder; thereby, in order to obtain required driving forces, it has been necessary to provide complex magnetic circuits having inner yokes. For this reason, introduction holes are provided for the lens holder so as to introduce the inner yokes thereinto, which has caused a problem in which it is difficult to increase stiffness of the lens holder.

The present invention has been directed at solving those problems described above, and an object of the invention is to obtain, in an optical driving device in which a plurality of objective lenses is held in a lens holder, the optical driving device that is compact and high in stiffness.

An optical driving device according to the present invention comprises:

a holder for holding a plurality of optical units each of which focuses on an optical disk a light beam outputted from a light source, focusing coils, and tracking coils;

a plurality of elastic support members for supporting the holder so as to be movable in an approximately radial direction of the optical disk and in an approximately perpendicular direction to the optical disk; and a base for holding inner yokes placed inside the holder, and magnets that generate magnetic fields with respect to the focusing coils and to the tracking coils; the optical driving device is characterized in that the top face of the holder has a closed structure over the inner yokes.

According to the present invention, because the top face of a holder has a closed structure over inner yokes, there exists an effect in which a small-size optical driving device with high stiffness can be obtained.

BEST MODE FOR CARRYING OUT THE INVENTION

Embodiment 1

Figure 1:
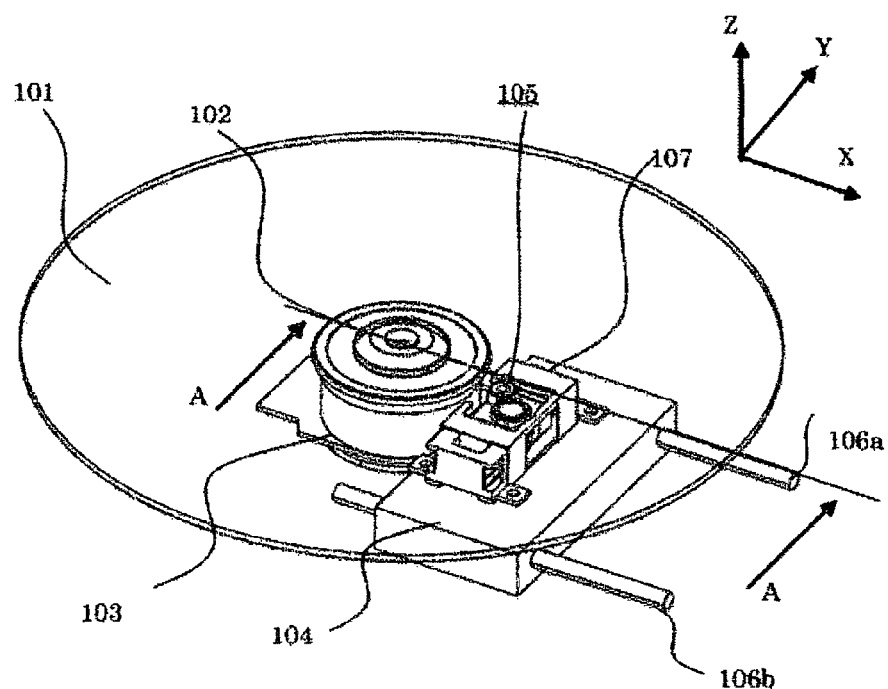
FIG. 1 is a perspective view illustrating an optical driving device and its surrounding main components in Embodiment 1.
Figure 2:
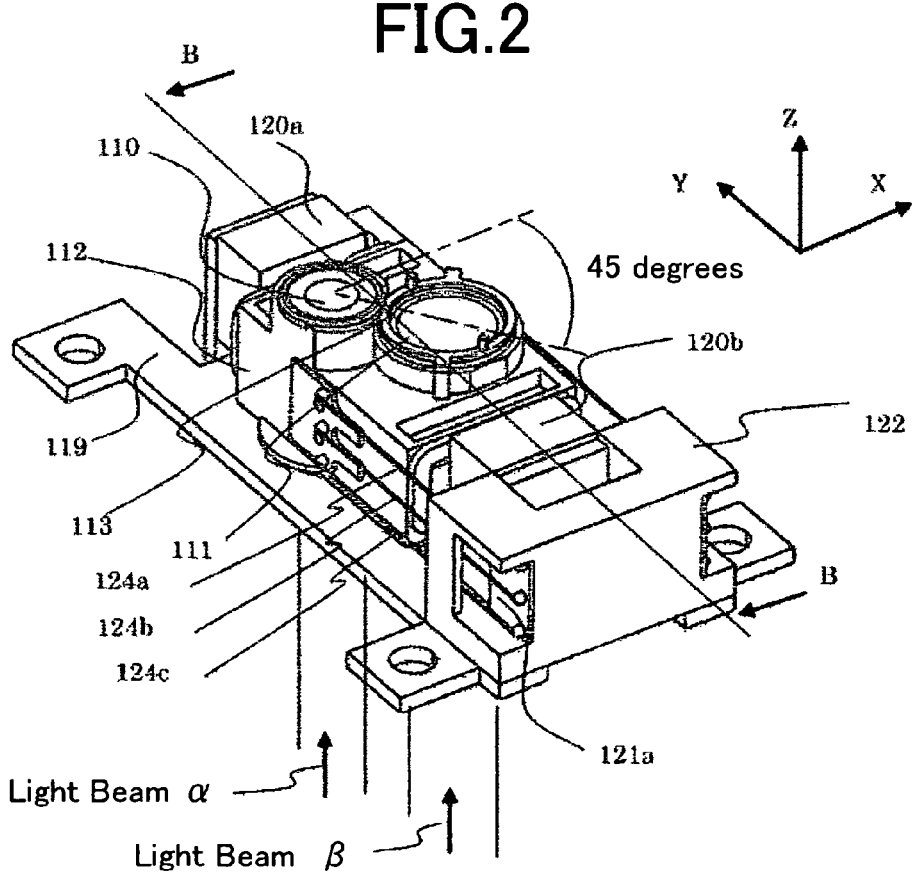
FIG. 2 is a perspective view illustrating the optical driving device in Embodiment 1.
Figure 3:
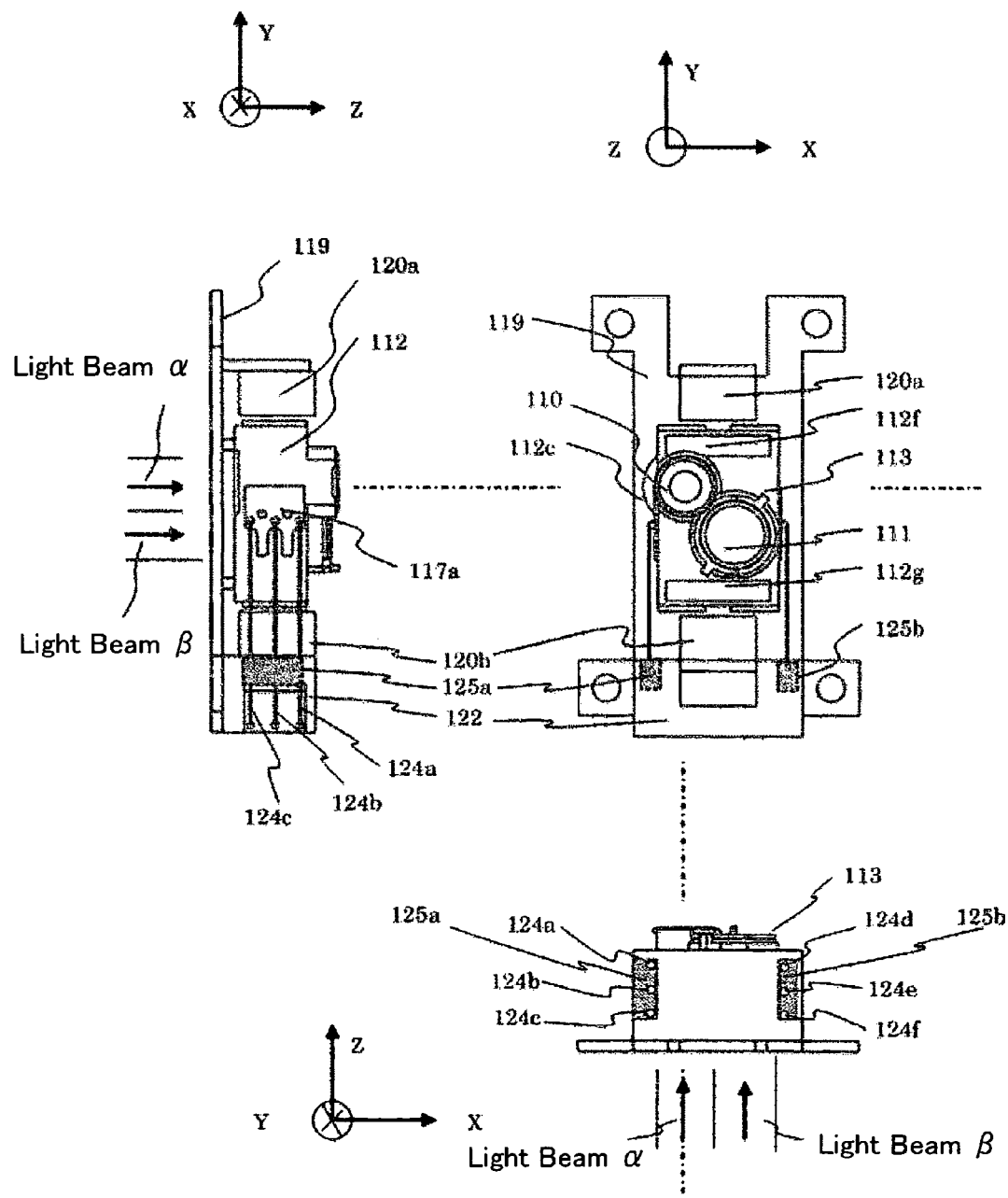
FIG. 3 is a three-view drawing of the optical driving device 105 in Embodiment 1.
Figure 4:
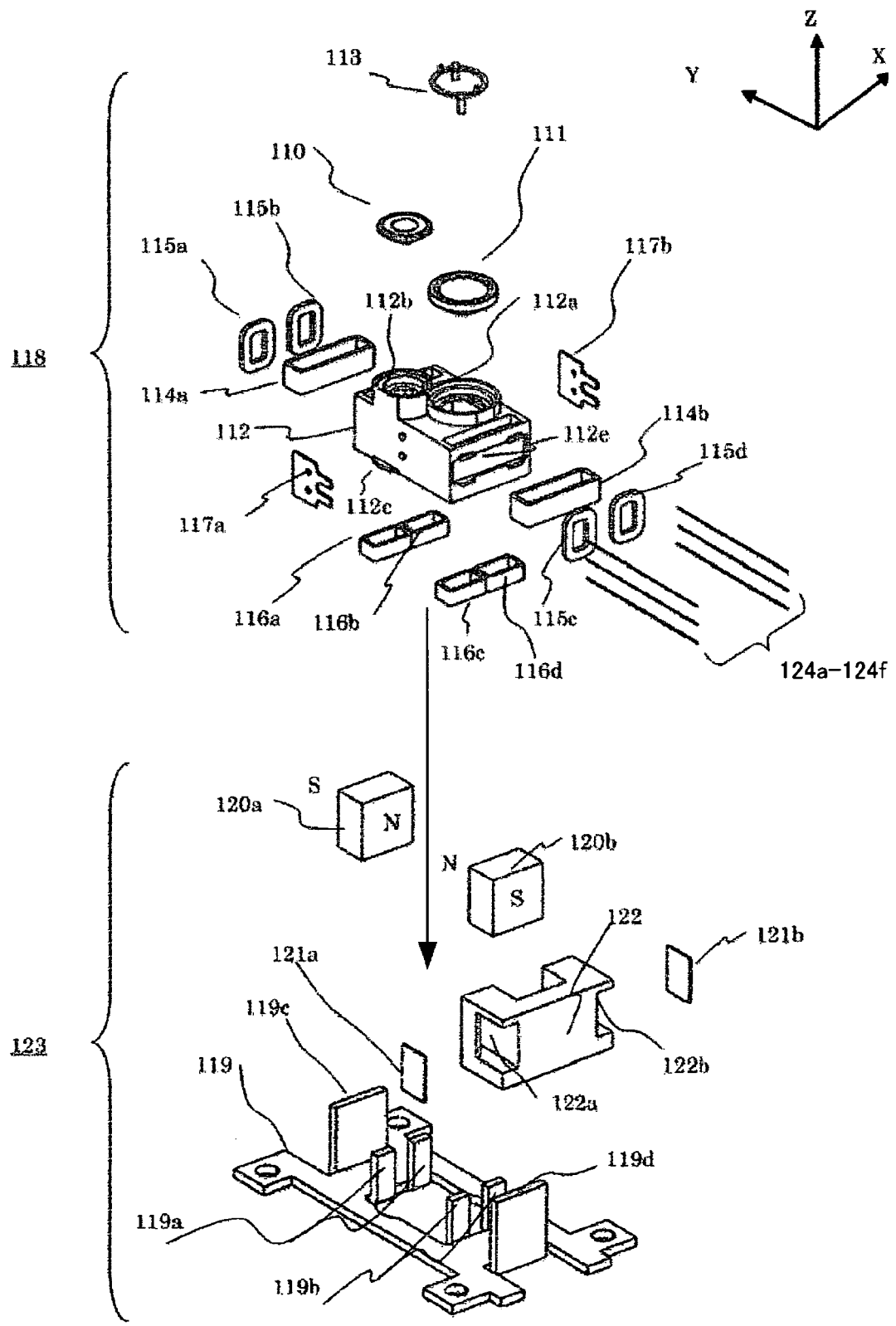
FIG. 4 is an exploded diagram of the optical driving device in Embodiment 1.
Figure 5:
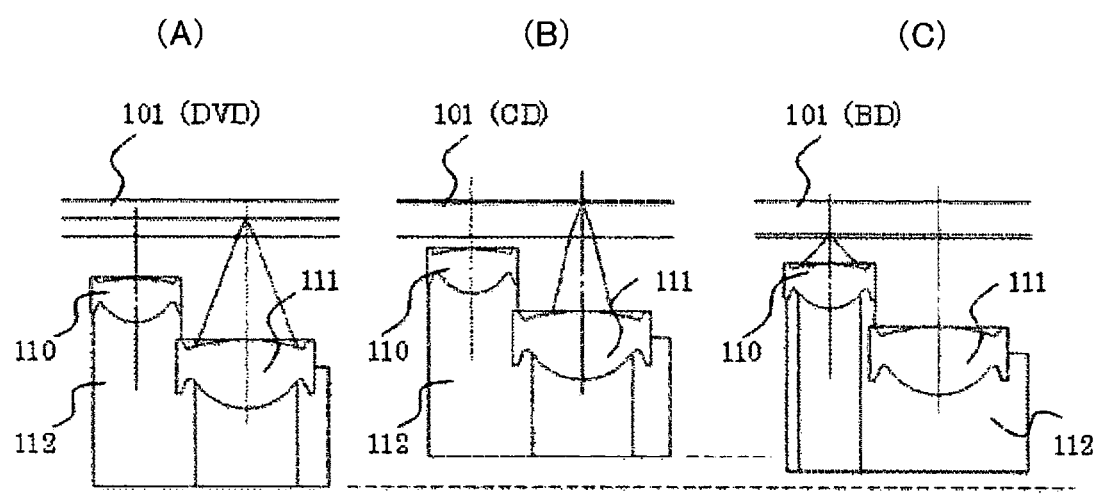
FIG. 5 is an illustrative diagram of arranged heights of objective lenses in Embodiment 1.
Figure 5:
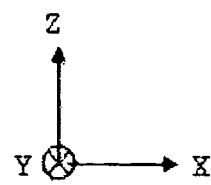
Figure 6:
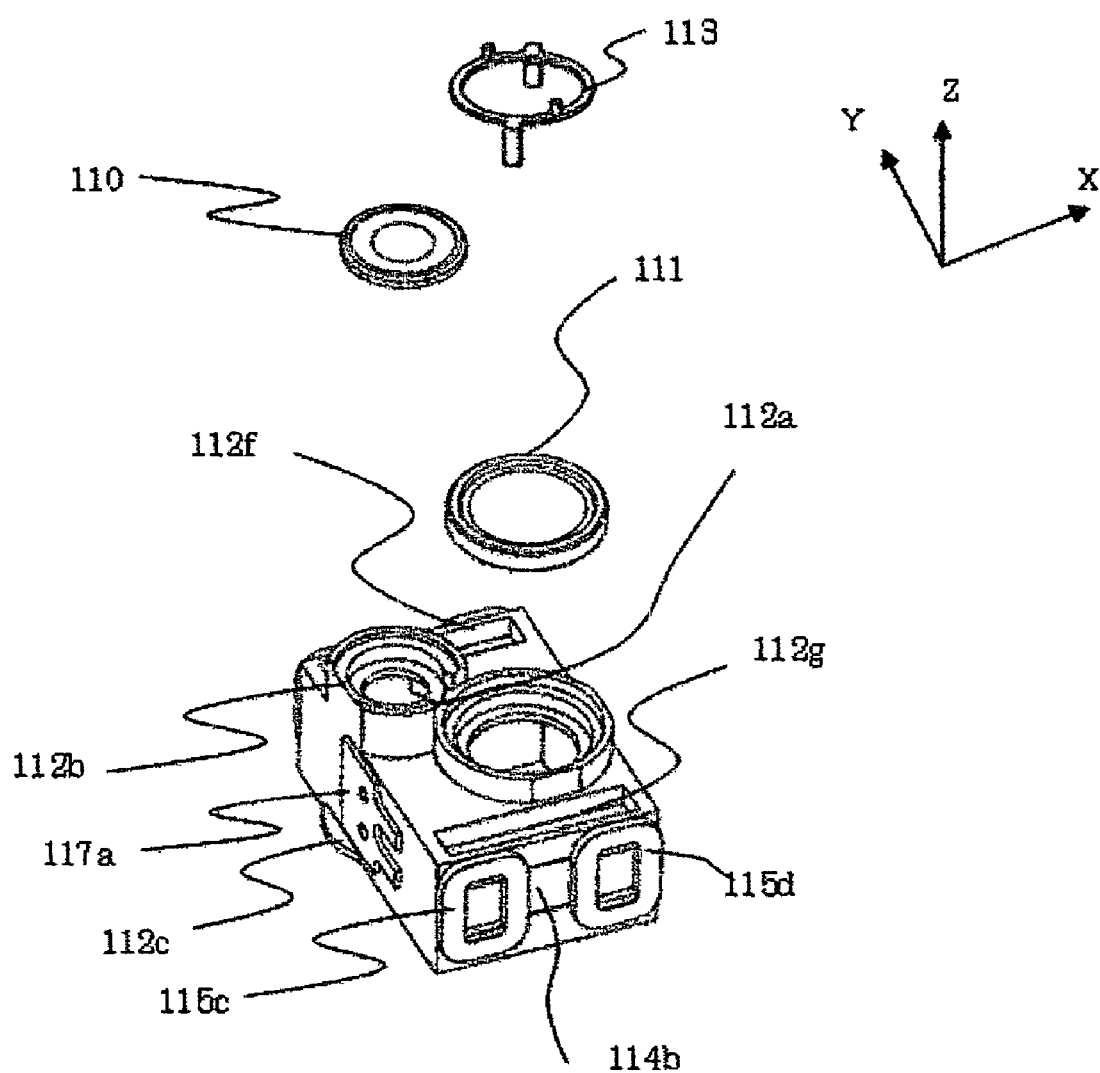
FIG. 6 is a perspective view illustrating a mounting structure of the objective lenses in Embodiment 1.
Figure 7:
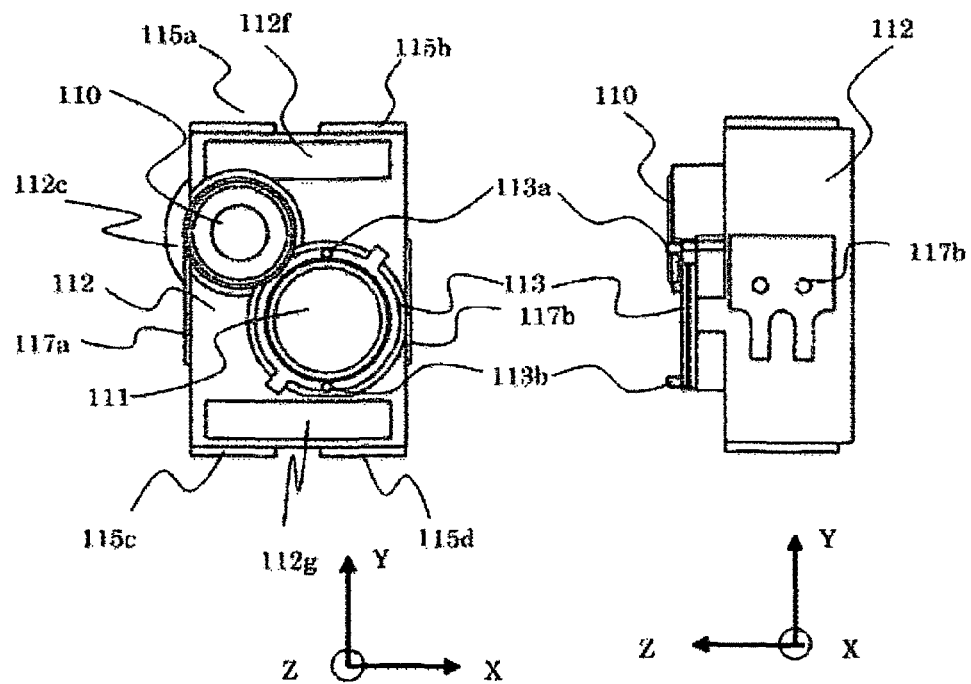
FIG. 7 is a front view and a side view for explaining a mounting state of the objective lenses and a protector in Embodiment 1.
Figure 8:
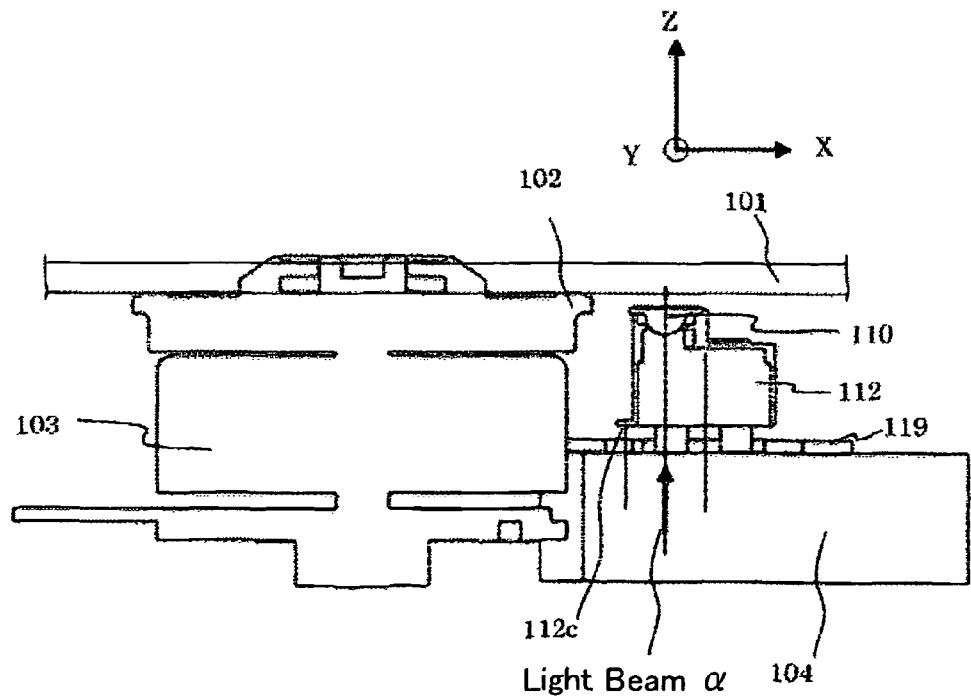
FIG. 8 is a cross-sectional side view taken from the line A-A of FIG. 1 in Embodiment 1.
Figure 9:
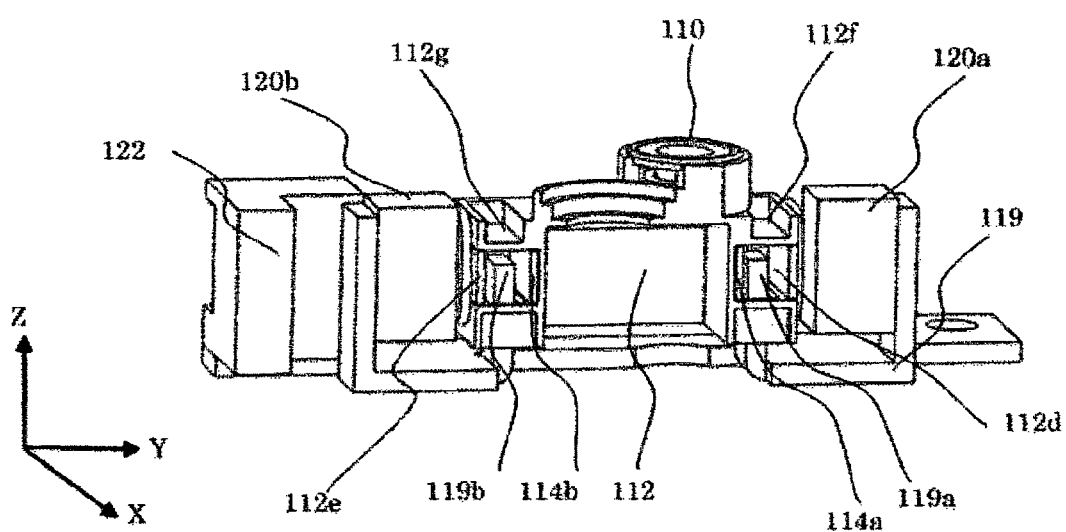
FIG. 9 is a cross-sectional side view taken from the line B-B of FIG. 2 in Embodiment 1.
Figure 10:
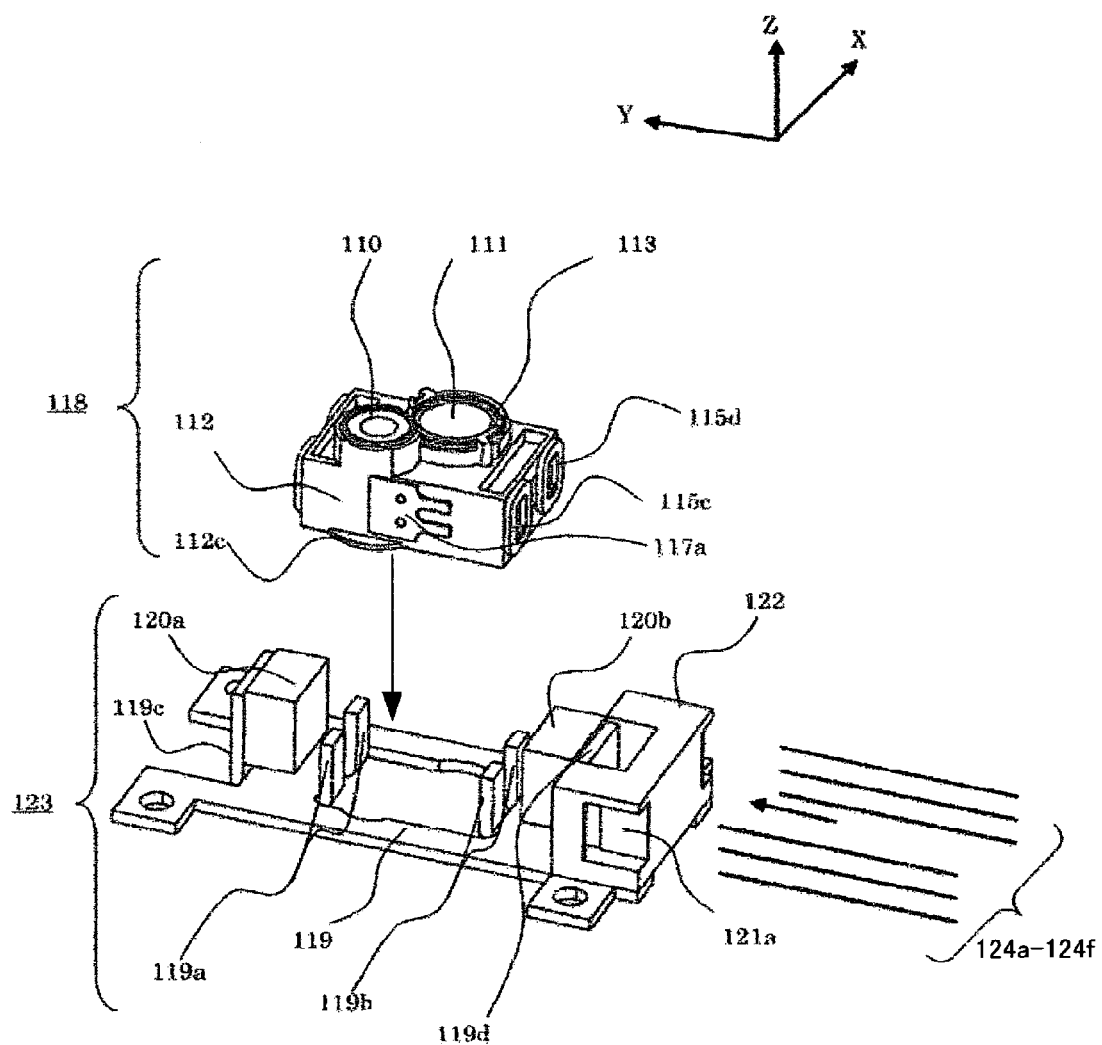
FIG. 10 is a perspective view of a movable unit and a fixed unit of the optical driving device in Embodiment 1 each of which having been preassembled.

FIG. 1 is a perspective view showing an optical driving device 105 and its surrounding main components in Embodiment 1 of the present invention; FIG. 2, a perspective view illustrating the optical driving device 105; FIG. 3, a three-view drawing of the optical driving device 105; FIG. 4, an exploded diagram of the optical driving device 105; FIG. 5, an illustrative diagram of arranged heights of objective lenses 110 and 111 that are parts of the optical driving device 105; FIG. 6, a perspective view illustrating a mounting structure of the objective lenses 110 and 111; FIG. 7, a front view and a side view for explaining a mounting state of the objective lenses 110 and 111, and a protector 113; FIG. 8, a cross-sectional side view taken from the line A-A of FIG. 1; FIG. 9, a cross-sectional side view taken from the line B-B of FIG. 2; FIG. 10, a perspective view of a movable unit 118 and a fixed unit 123 of the optical driving device 105 in Embodiment 1 each of which having been preassembled; and FIG. 11, another perspective view observed from a different viewpoint for FIG. 10.

In addition, as for the X, Y and Z coordinate axes indicated in each of the figures, the Z-axis is denoted in parallel with an optical axis of the objective lenses each; the X-axis, denoted in a radial direction of a discoid recording medium, perpendicular to the Z-axis; and the Y-axis, denoted in the direction orthogonal to these two axes.

In what follows, Embodiment 1 of the present invention will be explained by using FIG. 1 through FIG. 11. In FIG. 1 through FIG. 11, numeral 101 designates an optical disk that is an optical information-recording medium; numeral 102, a turntable on which the optical disk 101 is attached; and numeral 103, a spindle motor for rotating the turntable 102. Numeral 104 designates an optics base that is mounted with a plurality of light sources such as semiconductor lasers (not shown) and the optical driving device 105, and is supported so as to be movable in radial directions (X-axis directions) of the optical disk 101 by guide shafts 106a and 106b. In addition, numeral 107 designates a cover to protect the optical driving device 105.

As for light beams emitted from the light sources not shown in the figures, such as semiconductor lasers (not shown), a light beam whose wavelength is in the vicinity of 405 nm and emitted from such a blue semiconductor-laser is designated as a light beam α; and a red light-beam whose wavelength is in the vicinity of 660 nm and a light beam whose wavelength is in the vicinity of 780 nm, emitted from a two-wavelength semiconductor-laser, are designated as a light beam β. Numerals 110 and 111 designate the objective lenses that focus the light beam α and the light beam β on the optical disk 101, respectively; for example, the objective lens 110 is used for a BD (Blu-ray disc), and the objective lens 111, for two focal points compatible with a CD (compact disc) and a DVD (digital versatile disc); starting with outer dimensions, specifications of the focal length, an active range (working distance) or the like differ from each other.

The objective lens 110 and the objective lens 111 are arranged in such a way that the optical axes of the objective lenses are parallel to the Z-axis, and a line segment connecting between the centers of the objective lenses is shifted at a predetermined angle with respect to the X-axis. In this embodiment, the angle is selected at 45 degrees; thereby, it is also configured that, by way of a wavelength selective mirror (not shown) placed below the objective lens 110 and the objective lens 111, the light beam α and the light beam β each are incident thereto from a direction at an angle of 45 degrees that is equal to the placement angle of the objective lens 110 and the objective lens 111. A lens holder 112 is formed by plastic that is light in weight and high in stiffness, and is approximately shaped in a rectangular parallelepiped having faces perpendicular to the Z-axis, lateral sides perpendicular to the X-axis, and lateral sides perpendicular to the Y-axis. Here, the objective lens 111 is arranged in such a manner that, when the optical disk 101 is a "DVD," a focal point is formed in a state in FIG. 5(A), and when a "CD," the lens holder 112 moves in the Z-axis directions so that a focal point is formed in a state in FIG. 5(B). When the optical disk 101 is a "BD," a position of the lens holder 112 along the Z-axis is arranged in such a manner that the position of the objective lens 110 used for the "BD" in this embodiment is determined along the Z-axis so that a focal point is formed at the position in FIG. 5(C) so as to come between the position in FIG. 5(A) and the position in FIG. 5(B).

Mounting positions of the objective lenses will be explained by using FIG. 6 and FIG. 7. At a mounting portion for the objective lens 110 formed in the lens holder 112, a cutout 112a is made so as to mount the objective lens 111. A state in which the objective lenses 110 and 111 are mounted on the lens holder 112 demonstrates such a state that a portion of the objective lens 111 hides under the objective lens 110; thus, the perimeters thereof are placed overlapping with each other when viewed along the optical axes. Here, by comparing the distances between each of the objective lenses 110 and 111, and the optical disk 101, the protector 113 that is a protection means against an occurrence of a collision between the optical disk 101 and the objective lenses is fixed upon the top face of the objective lens 111 that is the one whose distance to the optical disk 101 is larger than the other. Two protrusions 113a and 113b are formed upon the top face of the protector 113 so that the tips of the protrusions 113a and 113b are placed slightly more projective than the top face of the objective lens 110. In addition, a cutout 112b is made at a mounting portion for the objective lens 110 in the lens holder 112 in an X-axis direction thereof; then, a portion of the perimeter of the objective lens 110 extending from the cutout 112b is fixed overhanging from the lens holder 112.

FIG. 8 is a cross-sectional side view showing positional relationship among the optical disk 101, the turntable 102, the spindle motor 103, the objective lens 110 and the lens holder 112 when the optics base 104 is placed on the innermost side of the optical disk 101. A diameter of the spindle motor 103 is generally made smaller than a diameter of the turntable 102. In a case of this embodiment, it is configured that the perimeters of the turntable 102 and the objective lens 110 are set closest with each other. A light shield 112c is formed in a lower portion of the lens holder 112 so that the light beam α is prevented from leaking to the optical disk 101.

Figure 11:
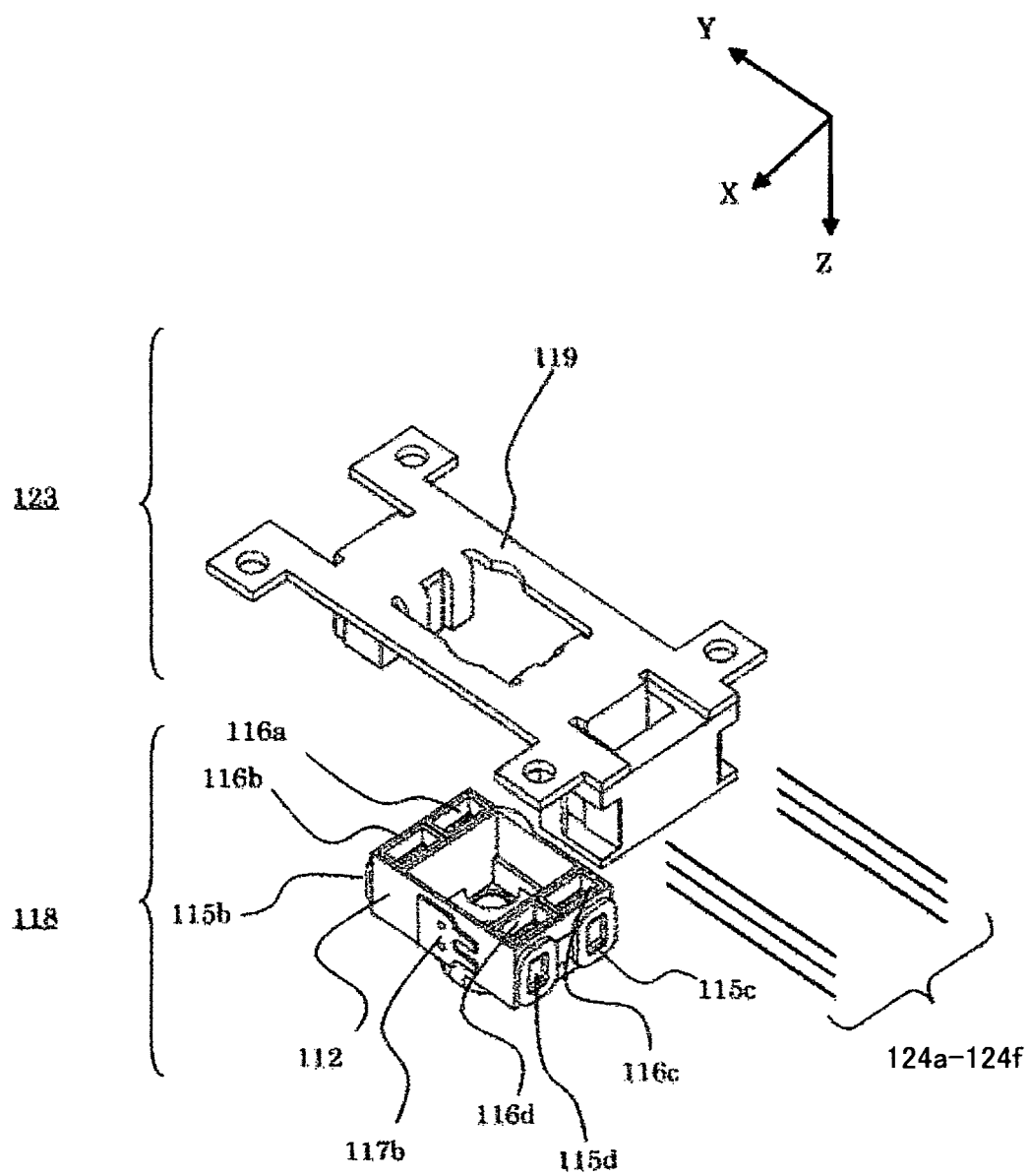
FIG. 11 is another perspective view observed from a different viewpoint for FIG. 10 in Embodiment 1.

FIG. 10 and FIG. 11 illustrate a perspective view of the movable unit 118 and the fixed unit 123 that are in a state individually assembled (partially refer to FIG. 9). First, the movable unit 118 will be explained. As for the lens holder 112 at the center of a pair of lateral side walls each perpendicular to the Y-axis, there provided are oblong holes 112d and 112e; two continuously wound focusing coils 114a and 114b are introduced and fixed thereinside where each of these has the coil-winding axis in the Z-axis directions; and then, on the pair of lateral side walls each perpendicular to the Y-axis, four continuously wound tracking coils 115a, 115b, 115c and 115d are fixed by adhesion where each of these has the coil-winding axis in the Y-axis directions. In addition, at a lower part of the lens holder 112 where the focusing coils 114a and 114b are fixed, four continuously wound tilting coils 116a, 116b, 116c and 116d are fixed by adhesion where each of these has the coil-winding axis in the Z-axis directions.

In addition, as shown by a cross-sectional side view in FIG. 9, the top face of the lens holder 112 is covered by wall portions 112f and 112g each having a downward column; thus, it is so arranged that the light beam α and the light beam β do not leak also in the Y-axis directions of the lens holder to the optical disk 101. Moreover, movable-side boards 117a and 117b are fixed to the lens holder 112 on a pair of lateral side walls thereof perpendicular to the X-axis each so as to solder the coil ends of the focusing coils 114a and 114b, the tracking coils 115a, 115b, 115c and 115d, and the tilting coils 116a, 116b, 116c and 116d, so that the movable unit 118 is configured.

Next, a configuration of the fixed unit 123 will be explained. A base yoke 119 is worked by pressing upon a magnetic material such as a cold-rolled steel plate, and has inner yoke portions 119a and 119b each provided with a slit at the center thereof; interposing the inner yoke portions 119a and 119b, magnets 120a and 120b magnetized in parallel in such a way that the identical poles face each other are fixed on fixing plates 119c and 119d of the base yoke 119, respectively; thereby, magnetic gaps are made to form closed circuits. In addition, a gel holder 122 fixed with fixed-side boards 121a and 121b is fixed by adhesion onto the base yoke 119. According to the manner described above, the fixed unit 123 is configured.

As shown in FIG. 2 and FIG. 3, one ends of wires 124a through 124f each that are conductive elastic members placed in parallel with one another in a respective group of three are fixed to the movable-side boards 117a and 117b by soldering; and other ends of the wires each are fixed to the fixed-side boards 121a and 121b by soldering. As a result, the movable unit 118 is elastically supported by the wires 124a through 124f so as to be movable in the Z-axis directions (focusing directions), the X-axis directions (tracking directions) and the directions of rotation about the Y-axis (tilting directions) with respect to the fixed unit 123.

For example, the wires 124*a* and 124*d* are connected to the focusing coils 114*a* and 114*b*; the wires 124*b* and 124*e*, connected to the tracking coils 115*a*, 115*b*, 115*c* and 115*d*; and the wires 124*c* and 124*f*, connected to the tilting coils 116*a*, 116*b*, 116*c* and 116*d*. The wires 124*a* through 124*f* are extended so as not to cut across the X and Z plane that includes the central axis of the spindle motor 103. Rectangular openings 122*a* and 122*b* are formed in the gel holder 122 for the fixed-side boards (refer to FIG. 4); in the rectangular openings 122*a* and 122*b*, gelatinous damper agents 125*a* and 125*b* that are of an ultraviolet curable type are filled so as to enclose around the end portions of the wires 124*a* through 124*f* each.

In addition, the inner yoke portions 119*a* and 119*b* are introduced into the holes of the tilting coils 116*a*, 116*b*, 116*c* and 116*d* oriented in a Z-axis direction, and into the holes of the focusing coils 114*a* and 114*b* oriented in the Z-axis direction; each side of the tracking coils 115*a*, 115*b*, 115*c* and 115*d* oriented in the Z-axis direction is placed so as to face the magnets 120*a* and 120*b* with each other. According to the above, magnetic circuits each configured by the inner yoke portions 119*a* and 119*b*, and the magnets 120*a* and 120*b* are formed to interpose the lens holder 112 therebetween in the Y-axis directions that observe a tangential direction of the optical disk 101.

The operations of the optical driving device configured as described above will be explained. First, when focusing error in a light spot is controlled, by supplying a focusing control voltage to predetermined terminals (not shown in the figures) of the fixed-side boards 121*a* and 121*b*, the focusing coils 114*a* and 114*b* connected in series each are energized by way of the wires 124*a* and 124*d* to which the focusing coils 114*a* and 114*b* are connected. According to this arrangement, electromagnetic force is generated along the Z-axis by mutual action with magnetic fields generated from the magnets 120*a* and 120*b*; the movable unit 118, the objective lenses 110 and 111 are driven to move in approximately perpendicular directions (Z-axis directions) with respect to the optical disk 101, so that a focusing control of the light spot is performed.

When tracking displacement of a light spot is controlled, by supplying a tracking control voltage to predetermined terminals (not shown in the figures) of the fixed-side boards 121*a* and 121*b*, the tracking coils 115*a* through 115*d* connected in series each are energized by way of the wires 124*b* and 124*e* to which the tracking coils 115*a* through 115*d* are connected. According to this arrangement, electromagnetic force is generated by mutual action with magnetic fields generated from the magnets 120*a* and 120*b*; the movable unit 118, the objective lenses 110 and 111 are driven to move in radial directions (X-axis directions) of the optical disk 101, so that a tracking control of the light spot is performed.

Next, when radial tilting displacement of a light spot is controlled, by supplying a tilting control voltage to predetermined terminals (not shown in the figures) of the fixed-side boards 121*a* and 121*b*, the tilting coils 116*a* through 116*d* connected in series each are energized by way of the wires 124*c* and 124*f* to which the tilting coils 116*a* through 116*d* are connected. Because the tilting coils 116*a* and 116*c*, and the tilting coils 116*b* and 116*d* are placed so that winding directions of the sets each are made in opposite orientations, by mutual action with magnetic fields generated from the magnets 120*a* and 120*b*, electromagnetic forces are generated in the tilting coils 116*a* and 116*c*, and the tilting coils 116*b* and 116*d* that are mutually opposite in the Z-axis directions, so that moment is generated in a direction of rotation about the Y-axis, and the movable unit 118 and as a result, the objective lenses 110 and 111 are moved rotationally; thereby, with respect to a tilt in radial directions (X-axis directions) of the optical disk 101, a radial tilting control of the light spot is performed so as to keep the optical axis of the objective lenses 110 and 111 always perpendicular to the optical disk.

In addition, because the movable unit 118 is elastically supported by the six wires 124*a* through 124*f* so as to be movable in the Z-axis directions, the X-axis directions and the directions of rotation about the Y-axis, the unit returns to a reference operating position along the Z-axis when energization to the focusing coils 114*a* and 114*b* is ceased; the unit returns to a reference operating position in the X-axis directions when energization to the tracking coils 115*a* through 115*d* is ceased; and the unit returns to a reference operating position in a direction of rotation about the Y-axis when energization to the tilting coils 116*a* through 116*d* is ceased. Moreover, because the end portions of the six wires 124*a* through 124*f* each fixed on the fixed-side boards 121*a* and 121*b* are filled by the gelatinous damper agents 125*a* and 125*b* held by the gel holder 122 so as to enclose the surroundings, damping is given to the movable unit 118; thereby, a good focusing control characteristic, a tracking control characteristic and a radial tilting control characteristic can be obtained, and at the same time unwanted vibrations from outside are not easily transferred to the movable unit 118. In addition, when the movable unit 118 moves in a direction to release from the optical disk 101 in a focusing-control direction, the wall portions 112*f* and 112*g* of the lens holder 112, and the inner yoke portions 119*a* and 119*b* are in contact with each other, so that the movable range is restricted.

In this embodiment, it has been explained that the wires 124*a* and 124*d* are connected to the focusing coils 114*a* and 114*b*; the wires 124*b* and 124*e*, connected to the tracking coils 115*a*, 115*b*, 115*c* and 115*d*; and the wires 124*c* and 124*f*, connected to the tilting coils 116*a*, 116*b*, 116*c* and 116*d*. However, positions of the wires are not necessarily limited to the positions described above; among six of the wires 124*a* through 124*f*, it is simply required to have every two wires as a pair connected to focusing coils, tracking coils or tilting coils.

As described above, because the magnetic circuits made of the magnets 120*a* and 120*b*, and the inner yoke portions 119*a* and 119*b* are formed to interpose the lens holder 112 therebetween in a tangential direction of the optical disk 101, and the inner yoke portions 119*a* and 119*b* are placed inside the lens holder 112 in which the top face thereof is closed; therefore, it becomes possible to provide an optical driving device that is high in sensitivity, high in stiffness and small in size in radial directions of the optical disk 101.

In addition, because the two objective lenses 110 and 111 are placed being shifted with reference to the X-axis directions, dimensions between the centers of the two objective lenses 110 and 111 in a radial direction (X-axis direction) of the optical disk 101 can be made small; thereby, it is possible to obtain an optical driving device capable of reading/writing information from/on the innermost track of the optical disk 101 in an easier manner without interfering with the turntable 102 or the spindle motor 103 when the objective lens 111 placed on the outer side is used.

That is to say, because a plurality of objective lenses is placed at an angle with a radial direction of an optical disk, in particular with an objective lens placed on the outer side of the optical disk, it becomes possible to read/write the information from/on the innermost track of the optical disk. In addition, it is no more necessary to make small in diameter by cutting out a turntable that holds the optical disk. Moreover, use of a spindle motor small in diameter and demanding in price is no more required, so that it becomes possible to reduce costs.

In addition, in a lower portion of a lateral side wall of the lens holder 112 in an X-axis direction, the light shield 112c is formed so that it prevents leakage of an incident light-beam; therefore, it is possible to avoid interference between the light shield 112c and the turntable 102, and to place the optical driving device 105 closer to the inner side of the optical disk 101. In addition, on the opposite side to the objective lens 110 and the objective lens 111 with respect to the Z-axis directions, there placed is the light shield 112c, which therefore acts as a balancer that keeps on a weight balance of the movable unit 118.

In addition, it is configured that, at the mounting portion of the lens holder 112 for the objective lens 110, the cutout 112b is made at a portion in adjacent to the turntable 102; and a perimeter portion of the objective lens 110 is overhanging from the lens holder 112. Therefore, it becomes possible to place the centers of the objective lenses 110 and 111 closer to the inner track of the optical disk 101.

In addition, because the two objective lenses 110 and 111 each are placed at different heights along the Z-axis, and portions of the two objective lenses 110 and 111 are placed overlapping with each other when viewed along the Z-axis, it becomes possible not only to obtain a movable unit that is compact and light in weight, but also to place the objective lens 111 placed on the outer side of the optical disk 101 closer to the inner side of the optical disk 101.

In addition, because the tilting coils 116a through 116d are also mounted on the lens holder 112, the lens holder 112 can be moved rotationally on the Y-axis, so that it becomes possible to perform a radial tilting control.

In addition, because a focusing position of the objective lens 110 is placed so as to come between two focusing positions of the objective lens 111 having two focal points, positional shifts due to focusing movement can be made small even when recording or playback is performed on various kinds of such a different optical disk 101, so that it becomes possible not only to reduce changes in property that depends on a kind of the optical disk, but also to design to make an adjustable focusing range small; therefore, a compact optical driving device can be made available.

Moreover, a configuration is adopted to place the protector 113 upon the top face of the objective lens 111, which is farther away from the optical disk 101 than the top face of the objective lens 110. The protector 113 has protruded portions slightly more projective than the top face of the objective lens 110. Therefore, such a protector that protects the optical disk 101 can be made in an inexpensive and simple shape.

What is claimed is:

1. An optical driving device, comprising:
   a holder for holding a plurality of optical units each of which focuses on an optical disk a light beam outputted from a light source, focusing coils, and tracking coils;
   a plurality of elastic support members for supporting said holder so as to be movable in an approximately radial direction of the optical disk and in an approximately perpendicular direction to the optical disk;
   a first magnet and a second magnet disposed so that the same poles thereof are opposing each other for generating magnetic fields with respect to the focusing coils and to the tracking coils; and
   a base yoke having a first fixing plate portion and a second fixing plate portion holding said first magnet and said second magnet respectively, and inner yoke portions each provided with a slit at the center thereof; wherein upon said base yoke, the inner yoke portions are placed collinearly with the first fixing plate portion and the second fixing plate portion, and are placed in an intermediary position between the first fixing plate portion and the second fixing plate portion;
   the top face of said holder has a closed structure, and a surrounding wall portion is formed on a lateral side of said holder; and
   each of the inner yoke portions is introduced inside the top face of said holder and the surrounding wall portion.

2. The optical driving device as set forth in claim 1, wherein a straight line connecting the first fixing plate portion, the inner yoke portions and the second fixing plate portion with one another is parallel to an approximately tangential direction of the optical disk being perpendicular to the approximately radial direction of the optical disk.

3. The optical driving device as set forth in claim 1, wherein a plane including the optical axes of at least two optical units out of the plurality of optical units is nonparallel to the approximately radial direction of the optical disk.

4. The optical driving device as set forth in claim 3, wherein a plane including the optical axes of at least two optical units out of the plurality of optical units forms an angle of some 45 degrees with respect to the approximately radial direction of the optical disk.

5. The optical driving device as set forth in claim 1, wherein a light shield is formed in a lower portion of a lateral side wall of the holder in the approximately radial direction of the optical disk so as to prevent leakage of the light beam.

6. The optical driving device as set forth in claim 1, wherein a cutout is formed on a portion of the holder for mounting at least one optical unit in the approximately radial direction of the optical disk; and
   the perimeter of said at least one optical unit has a portion overhanging from a lateral side of said holder.

7. The optical driving device as set forth in claim 1, wherein each of the plurality of optical units is placed at different heights in a direction perpendicular to the optical disk, and is placed so as to overlap with one another in the direction perpendicular to the optical disk.

8. The optical driving device as set forth in claim 1, wherein the holder holds tilting coils and thereby can be rotationally moved on an axis in an approximately tangential direction of the optical disk.

9. The optical driving device as set forth in claim 1, wherein the plurality of optical units includes an objective lens having one focal point and an objective lens having two focal points; and
   the objective lens having one focal point and the objective lens having two focal points are placed in such a way that a focusing position by the objective lens having one focal point comes between two focusing positions by that having two focal points.

10. The optical driving device as set forth in claim 1, wherein
    a top face of each of the plurality of optical units is placed at different heights in a direction perpendicular to the optical disk; and
    a protection member is attached on one of the plurality of optical units whose top face is not nearest to the optical disk so that a top of the protection member is higher than another one of the plurality of optical units whose top face being nearest to the optical disk.

* * * * *